(12) United States Patent
Costa

(10) Patent No.: US 7,243,612 B2
(45) Date of Patent: Jul. 17, 2007

(54) DEVICE INTRODUCED IN TOILET FOR PETS

(75) Inventor: Christiane Campello Costa, Rua Jerônimo Coelho, 30 - apt.10 - Porto Alegre, Rio Grande do Sul (BR)

(73) Assignee: Christiane Campello Costa, Rio Grande do Sul (BR)

( * ) Notice: Subject to any disclaimer, the term of this patent is extended or adjusted under 35 U.S.C. 154(b) by 0 days.

(21) Appl. No.: 11/332,624

(22) Filed: Jan. 13, 2006

(65) Prior Publication Data

US 2006/0156992 A1 Jul. 20, 2006

(30) Foreign Application Priority Data

Jan. 14, 2005 (BR) .................................. 8500039 U

(51) Int. Cl.
*A01K 29/00* (2006.01)

(52) U.S. Cl. .................. 119/161; 119/165; 119/166
(58) Field of Classification Search ................ 119/161, 119/165, 166; 47/65.9
See application file for complete search history.

(56) References Cited

U.S. PATENT DOCUMENTS

| 6,837,179 B2* | 1/2005 | Sannikka | ..................... 119/165 |
| 2001/0013318 A1* | 8/2001 | Kobayashi | ................... 119/161 |

* cited by examiner

*Primary Examiner*—Peter M. Poon
*Assistant Examiner*—Willie Berry, Jr.
(74) *Attorney, Agent, or Firm*—Richard B. Klar; Law Office of Ricahrd B. Klar

(57) ABSTRACT

A toilet device for use by dogs and cats. The device includes a grid, at least one tray and an upright structure. In addition other elements of the device can include a: picker for lifting the grid, cuts or grooves, side closures, slots and reinforcements.

3 Claims, 5 Drawing Sheets

DEVICE INTRODUCED IN TOILET FOR PETS

BACKGROUND OF THE INVENTION

1. Filed of the Invention

The present invention relates to a toilet to be used mainly by dogs, but also cats. The toilet device was designed so as to facilitate cleaning and keeping indoor environments clean. By using the toilet, dogs and cats evacuate in a single place and the toilet is easily cleaned after use. Thus, the dog's urine and feces are deposited in the toilet that will be subsequently cleaned by the pet's owner and replaced in the desired place in the house, apartment or anywhere else.

2. The Prior Art

The toilet device for pets as disclosed herein has several differences and functional improvements when compared to the prior art.

SUMMARY OF THE INVENTION

The present invention provides for orifices that allow a pet's urine to drain to the tray of the toilet device, thus preventing the pet paws from getting wet and dirtying the house. In order to facilitate the toilet cleaning, newspaper sheets or any other type of bedding are placed inside the tray. After the pet uses the toilet, a grid is manually removed and the wet paper is changed. If required, as in the case of feces, both the grid and the tray may be quickly washed with running water and replaced for use. Another important aspect is that the toilet is about 2 cm in height, thus facilitating the pet limb support when evacuating.

BRIEF DESCRIPTION OF THE DRAWINGS

In order to illustrate and understand the model described, the following drawings are presented.

DETAILED DESCRIPTION OF THE PREFERRED EMBODIMENTS

Figure 1:
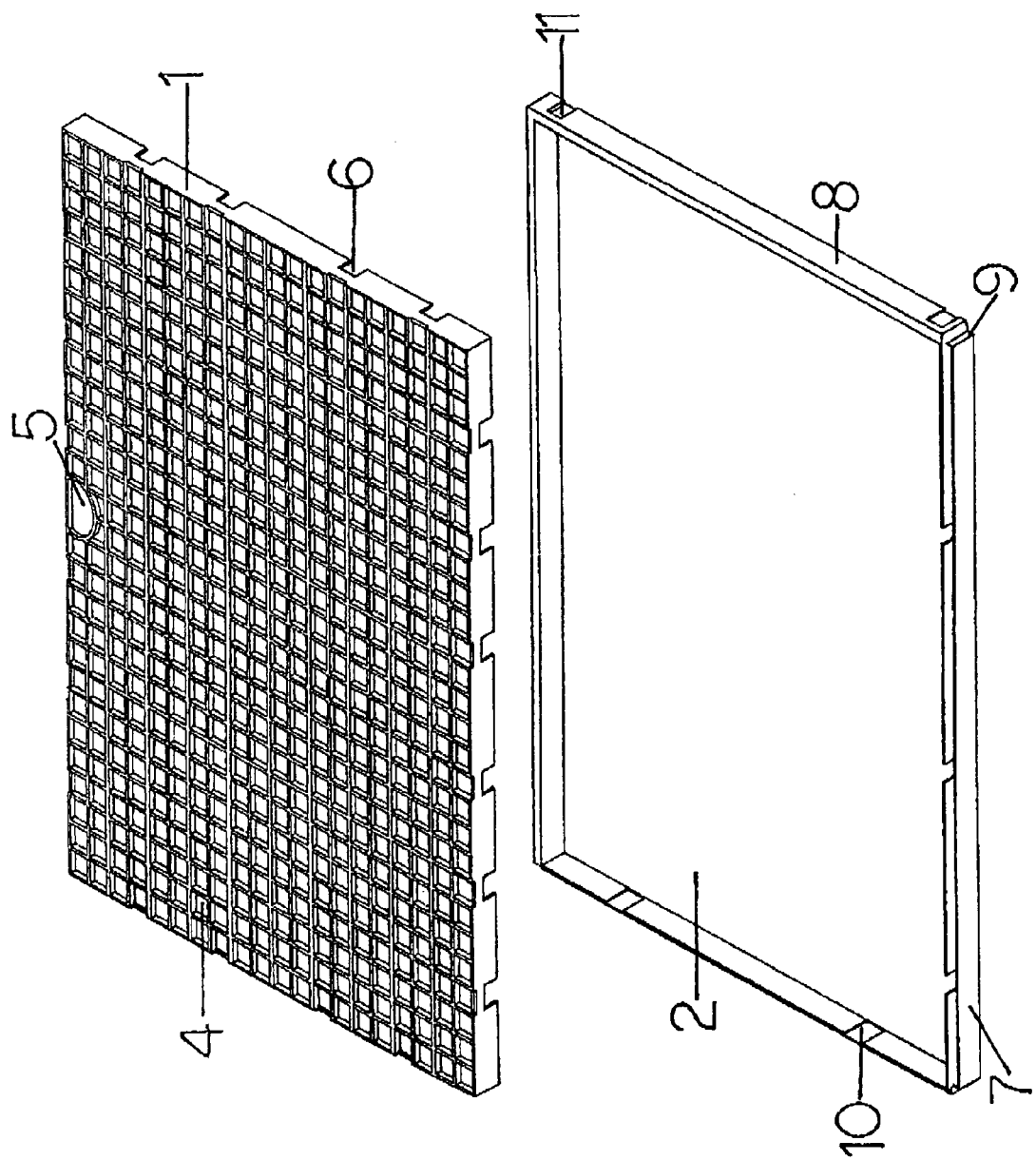
FIG. 1 is an exploded perspective view of grid (1) relative to tray (2).
Figure 2:
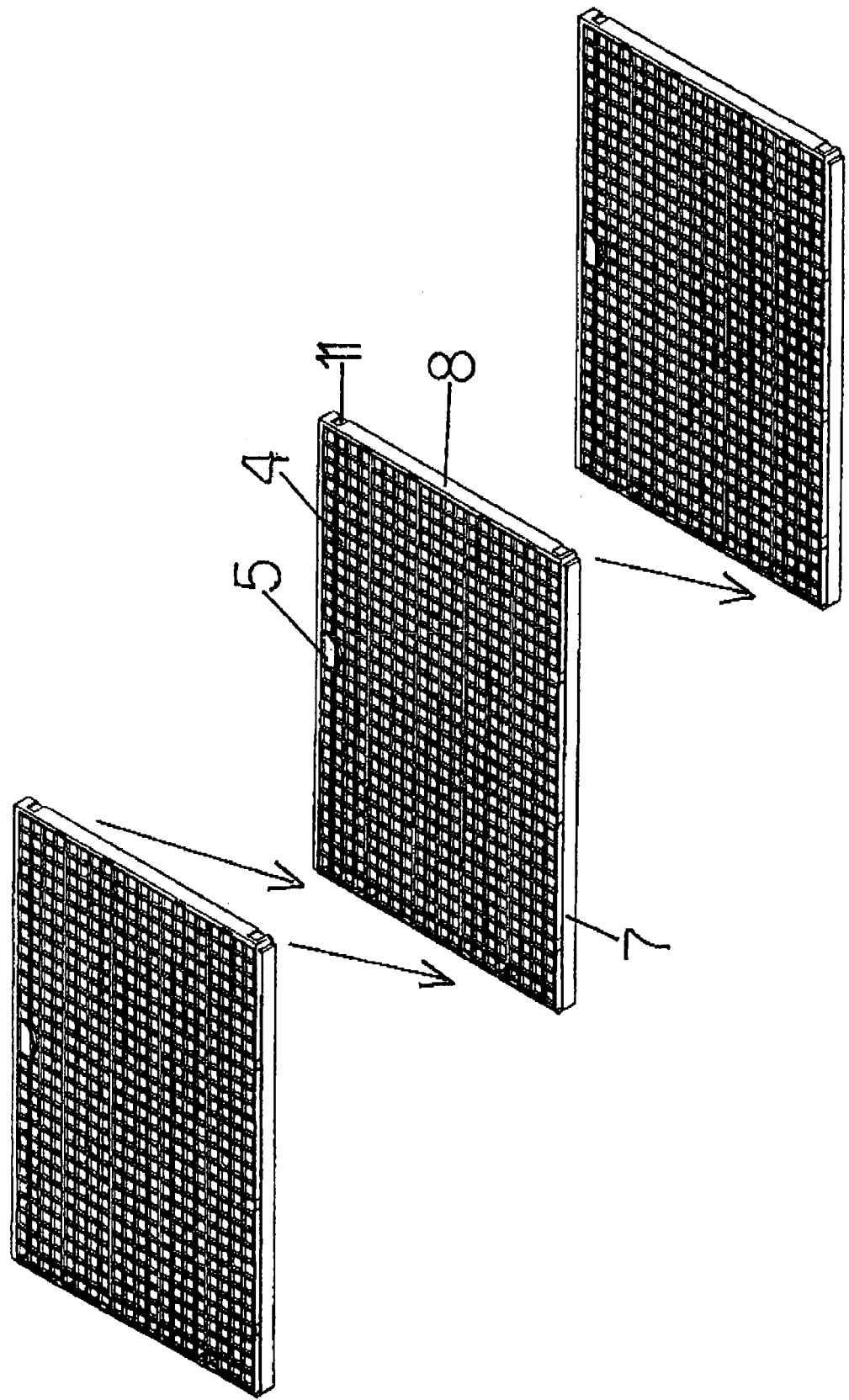
FIG. 2 is a schematic perspective view of three toilets in order to illustrate the possible connection among them.
Figure 3:
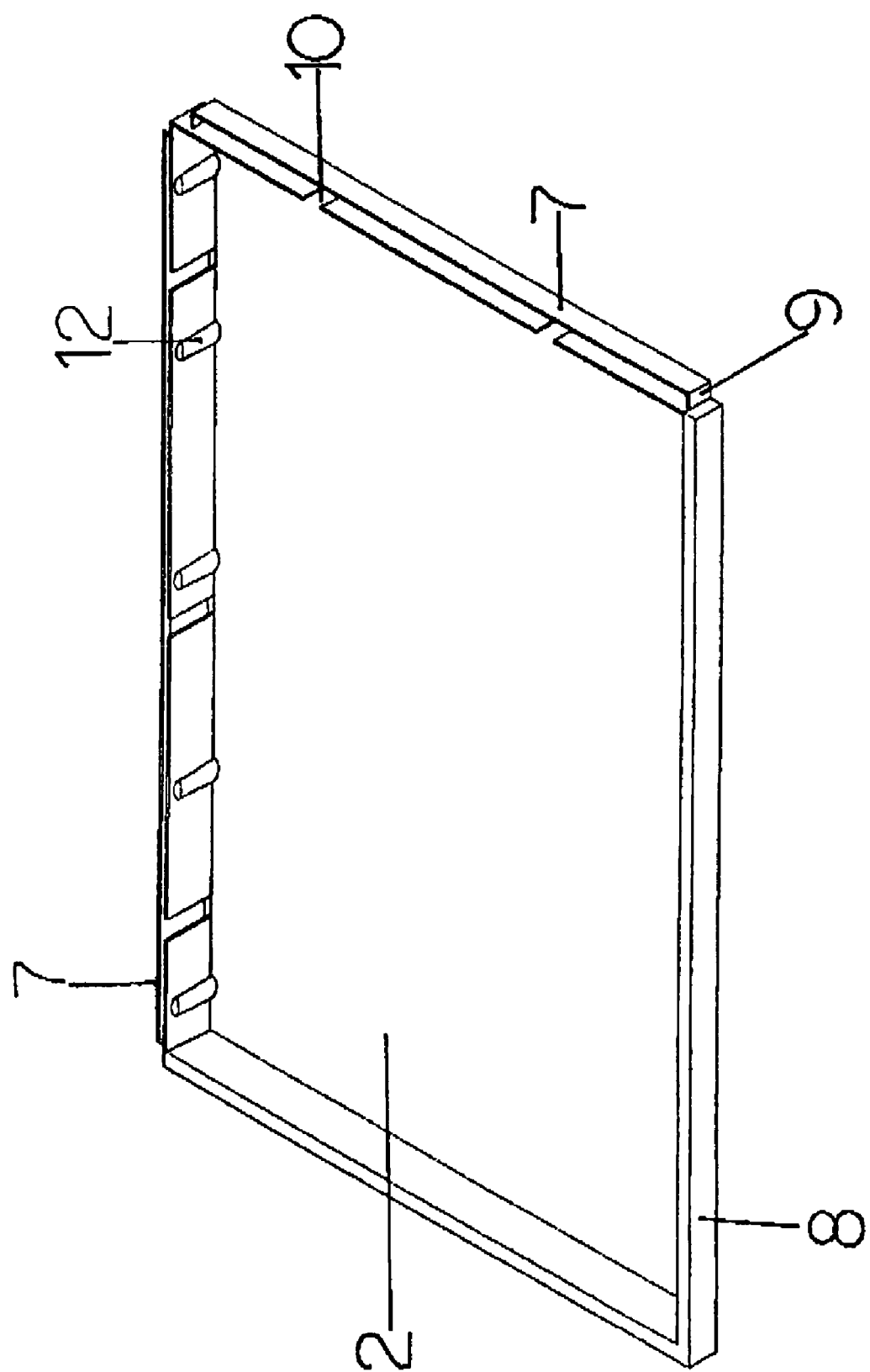
FIG. 3 is an isolated perspective view of tray (2).
Figure 4:
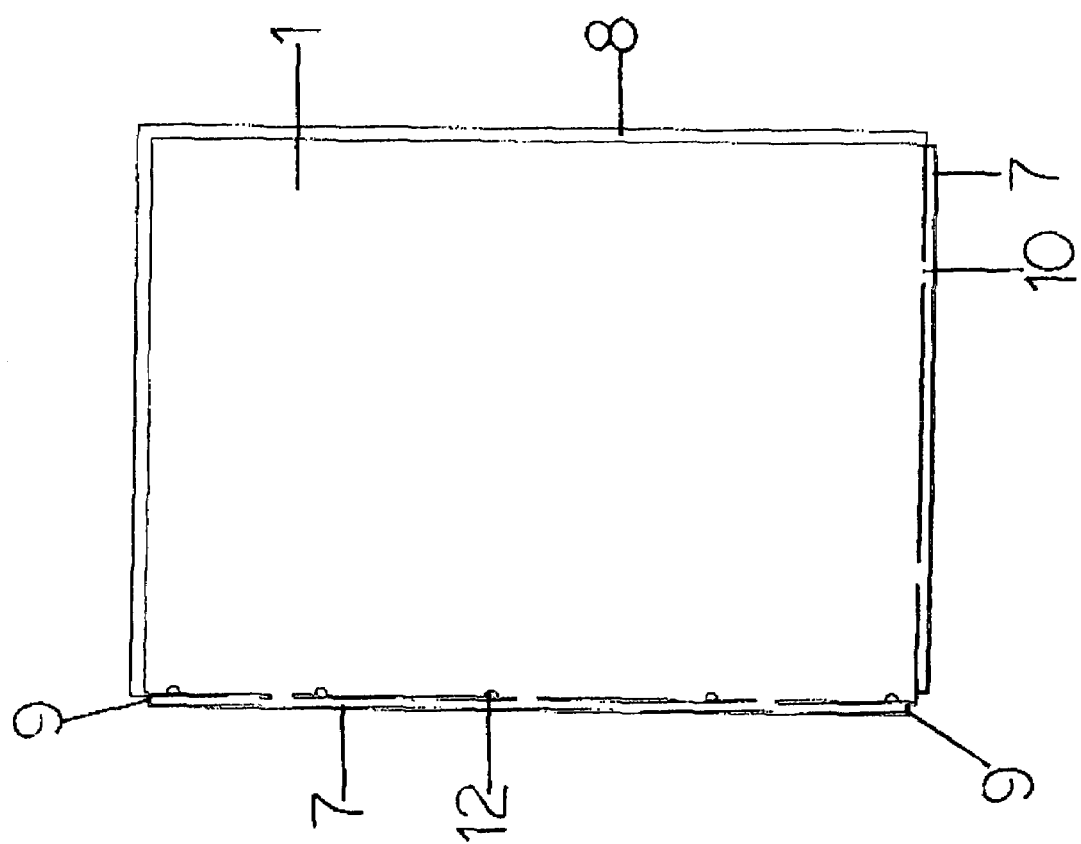
FIG. 4 is an isolated top view of tray (2).
Figure 5:
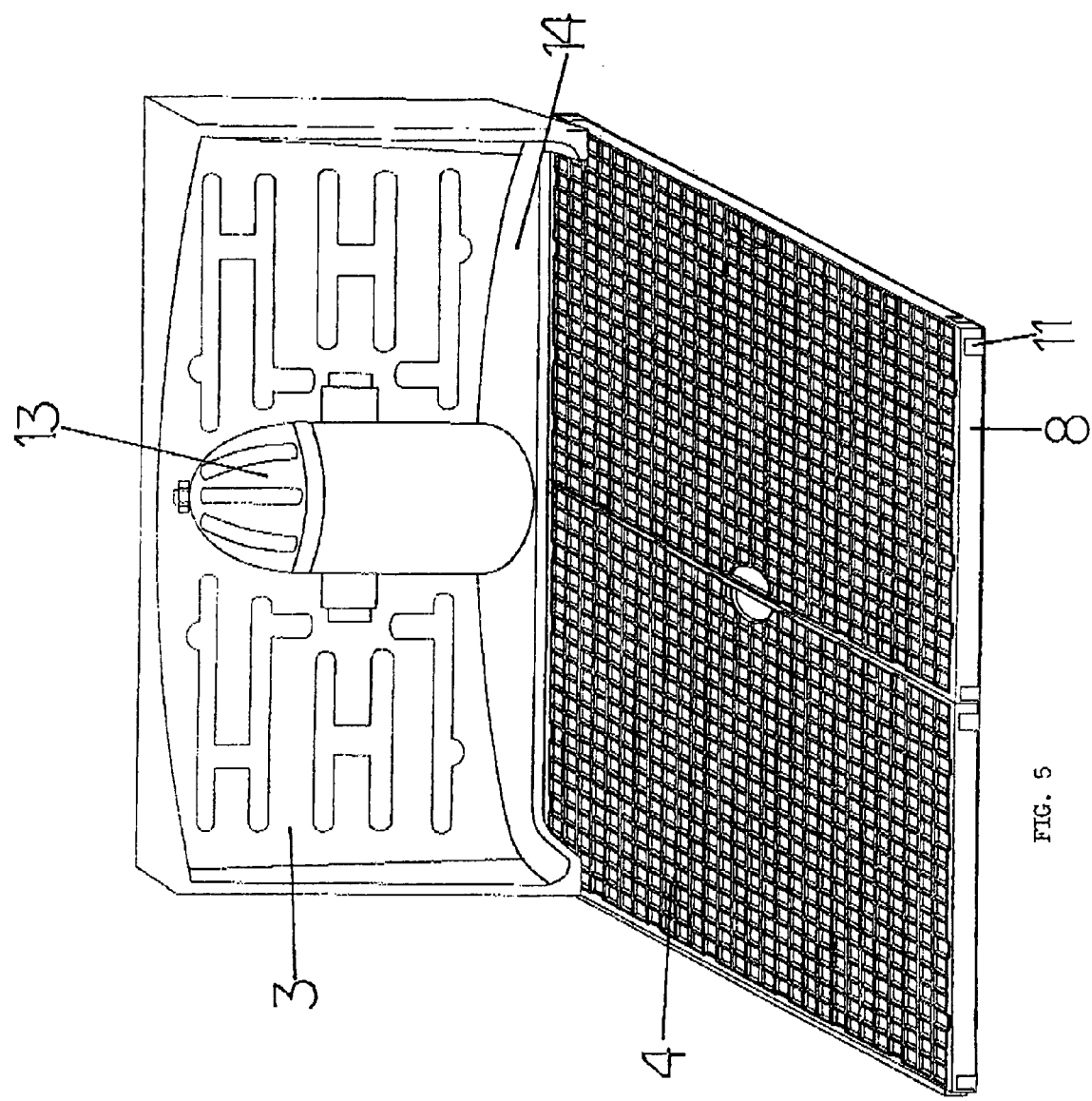
FIG. 5 is a perspective view of the connection of two toilets, including the upright structure (3).

Referring now to the drawings, FIGS. 1-5 describe the toilet device of the present invention in which the toilet device is made of resistant plastic material, basically formed of three elements that, once integrated, form a single unit: a grid (1), one or more trays (2) and an upright structure (3). The grid (1) is described as follows:

Grid (1) is engaged over tray (2) that is located on the floor. Grid (1) has several orifices (4) through which the dog's urine will drain, being deposited on tray (2). On the side of grid (1), there is a picker (5), being characterized in that a "half-moon"-shaped orifice facilitates the manual removal of grid (1) when engaged in tray (2). Grid (1) further has cuts (6) throughout its side structure, said cuts being used to allow drainage of the urine falling over the side of grid (1) on the side of tray (2) towards its center.

The tray (2) is described as follows: Tray (2) is a concave part having cavities. The cavities are arranged in two directions: from the base to the surface [base-surface] (7) and from the surface to the base [surface-base] (8). In other words cavities (7) are arranged in a first direction where the open end of the cavities faces upward toward the place where the grid (1) is to be located and the bottom end is closed. The other set of cavities (8) faces in a second direction (opposite the first direction) with the opening being located downward and the top portion being closed and facing upward toward where the grid (1) will be placed. The tray cavities allow the connection of two or more trays. This connection, obtained by engaging the cavities of different trays, increases the area the toilet occupies. The connection among the trays (2) will occur when the base-surface cavity (7) of a tray is engaged in the surface-base cavity (8) of another tray. This connection of two or more trays may be used for large dogs or simply when a larger toilet is desired.

An important aspect to be considered is the side closure (9) found in the base-surface cavity (7). This closure prevents the urine that occasionally drains on this portion of the tray from falling on the floor. Thus, the urine fall on the base-surface cavity (7) and drains to the tray by means of slots (10) in tray (2). Further regarding tray (2), the. openings (11) found in the surface-base cavity (8) must be emphasized. These openings allow the engagement of two trays, since they are required to allow the side closures (9) of the base-surface cavities (7) to pass. Internally, in one of the sides, the tray has reinforcements (12) that impart increased strength to the assembly when connecting two trays.

The upright structure (3) is another element of the toilet device of the present invention. The upright structure (3) is a part engaged in the back of two engaged trays. This structure (3) is also made of plastic material having an embossed hydrant drawing (13) in its central portion. The upright structure is to be used by male dogs so that they have a structural reference when lifting their hind limb to urinate. Like this, the dog urinates towards the wall. The urine tends to hit the structure, draining to the base (14) of the same. Said base (14) is protruded at a specific tilting that will direct the urine into tray (2). It is understood that the upright structure (3) is an optional feature of the present invention for used by male dogs.

The invention claimed is:

1. A toilet device for pets, comprising:

a grid having orifices through which urine from a pet can drain and a groove on a side of said grid to facilitate manual removal of said grid, said grid having side structures having cuts therein;

at least one tray having cavities in a first base-surface direction located on ends of said tray, and cavities in a second, surface-base direction located on ends of said tray wherein said cavities in said first base-surface direction facilitates connecting two or more of said at least one tray together, said cavities in said first base-surface direction having side closures to prevent a dog's urine from draining to a floor, said at least one tray having sides and said sides having slots and openings wherein said slots favor urine drainage towards a center of said at least one tray and wherein said openings allowing the side closures to pass when connecting the two trays, and reinforcements internally located in one of the sides of said at least one tray in order impart increased strength to said device.

2. The toilet device according to claim 1, further comprising an upright structure protruding at a specific tilting to direct urine into said at least tray.

3. The toilet device according to claim 2 wherein said upright structure has an embossed hydrant drawing located in a central portion of the upright structure.

* * * * *